United States Patent [19]

Reich et al.

[11] 4,232,228
[45] Nov. 4, 1980

[54] METHOD OF LIGHTENING RADIATION DARKENED OPTICAL ELEMENTS

[75] Inventors: Frederich R. Reich, Richland; Albert R. Schwankoff, W. Richland, both of Wash.

[73] Assignee: The United States of America as represented by the United States Department of Energy, Washington, D.C.

[21] Appl. No.: 64,597

[22] Filed: Aug. 7, 1979

[51] Int. Cl.³ .............................................. A61K 27/02
[52] U.S. Cl. ................................. 250/492 R; 250/341; 250/504 R; 350/96.30
[58] Field of Search .................. 350/96.30; 250/492 R, 250/504, 341; 204/DIG. 11; 219/121 LM

[56] References Cited

U.S. PATENT DOCUMENTS

| | | | |
|---|---|---|---|
| 1,681,991 | 8/1928 | Littleton | 250/341 |
| 2,855,517 | 10/1958 | Rainier et al. | 250/492 |
| 3,173,850 | 5/1965 | Hood | 250/492 |

OTHER PUBLICATIONS

"Gamma Radiation . . . on Plastics", by John W. Ryan Nucleonics, vol. 11, No. 8, Aug. 1953, pp. 13–15.

*Primary Examiner*—Harold A. Dixon
*Attorney, Agent, or Firm*—James E. Denny; Richard G. Besha; Frank H. Jackson

[57] ABSTRACT

A method of lightening a radiation-darkened optical element in wich visible optical energy or electromagnetic radiation having a wavelength in the range of from about 2000 to about 20,000 angstroms is directed into the radiation-darkened optical element; the method may be used to lighten radiation-darkened optical element in-situ during the use of the optical element to transmit data by electronically separating the optical energy from the optical output by frequency filtering, data cooling, or interlacing the optic energy between data intervals.

19 Claims, 11 Drawing Figures

METHOD OF LIGHTENING RADIATION DARKENED OPTICAL ELEMENTS

CONTRACTUAL ORIGIN OF THE INVENTION

The invention described herein was made in the course of, or under, a contract with the U.S. DEPARTMENT OF ENERGY.

BACKGROUND OF THE INVENTION

The application of optical components, whether glass or plastic, in high nuclear radiation areas has always been plagued by optical component degradation from radiation induced absorption. Traditional approaches to this problem have included the uses of a heavy radiation shield and special radiation resistant glasses. These special glasses usually have inferior optical properties, such as higher transmission losses and significant changes in image hue or color for a thick optical component, due to the added chemical constituents. For a fiber optic element in a coherent bundle, it is impractical to consider the use of conventional radiation resistant glass, that is glass having cerium distributed therein, because the long glass paths in the fiber optic bundle produce a severely degraded image. It has been suggested that pure silica be used in single fiber optic elements for data communication links, because pure silica has been shown to be resistant to radiation-induced darkening, but even pure silica exhibits radiation darkening upon sufficient exposure to nuclear radiation.

A presently accepted technique to eliminate the radiation-induced absorption has been to replace the damaged optical components or to thermally anneal these components. Thermal annealing, in these applications, is usually applied for fairly long time periods in the range of between about 6 hours and 24 hours depending upon the optical component thickness, and requires that the optical component be held at temperatures at the range of between about 200° C. and 300° C., in order to achieve a significant absorption fading or lightening of the radiation-induced darkening. Where either complex lenses or coherent optic bundles are employed, thermal annealing of the types described is inapplicable, because the fiber optic bundles as well as the complex lenses are generally epoxy bonded, and epoxy bonding material does not withstand the elevated temperatures necessary for the thermal annealing. For this reason, it is generally not practical to attempt thermal annealing of radiation-induced absorption in either coherent fiber optic bundles or any complex lens system or fiber optic component that is fabricated with epoxy binders.

The prior art known at the present time is limited to disclosures of radiation induced darkening and changes in the refractive index due to applied radiation, and includes U.S. Pat. No. 3,364,219 issued Jan. 11, 1972 to P. Sinai; U.S. Pat. No. 3,542,536 issued Nov. 24, 1970 to R. P. Flam et al.; U.S. Pat. No. 3,173,850 issued Mar. 16, 1965 to Hood; and a digest entitled Optical Fiber Transmission II published by the Optical Society of America, 1977, which includes a paper entitled In-Situ Measurements of Growth and Decay of Radiation Damage in Fiber Optic Waveguides by E. J. Friebele and G. H. Siegal, Jr., and a paper entitled Radiation Response of Low Loss Silicone Clad Silica Fiber by George H. Siegal, Jr.

SUMMARY OF THE INVENTION

According to the present invention, lightening of a radiation-darkening optical element is accomplished by directing electromagnetic radiation having a wavelength in the range from about 2000 to about 20,000 angstroms into a preselected area of the optical element.

An important object of the present invention is to provide a method of lightening a radiation-darkened optical element, comprising directing electromagnetic radiation having a wavelength in the range of from about 2000 to about 20,000 angstroms into a preselected area of the optical element for a period of time sufficient to effect the desired lightening.

Another object of the present invention is to provide a method of the type set forth in which the lightening is accomplished in less than about 4 hours, and further the exterior surface of the optical element impinged by the electromagnetic radiation is cooled to maintain the exterior surface below a preselected temperature.

Another object of the present invention is to provide a method of the type set forth in which the optical element is utilized to transmit information, and means are provided for maintaining the directed electromagnetic radiation separate from the transmitted information, whereby the optical element is lightened in-situ while transmitting information without interference by the directed electromagnetic radiation.

A further object of the present invention is to provide a method of lightening a radiation-darkened in-situ glass fiber optic, comprising providing a source of light having a wavelength in the range of from about 2000 to about 20,000 angstroms, directing the light into the in-situ glass fiber optic, and moving the light over a preselected volume of the in-situ glass fiber optic for a period of time to effect the desired lightening.

These and other objects of the present invention will be more readily understood by reference to the accompanying specification taken in conjunction with the drawings, in which:

DETAILED DESCRIPTION OF THE INVENTION

The radiation darkening with which this invention is concerned may result from any nuclear radiation but generally either beta or gamma. The optical element used in the examples hereinafter set forth was a glass fiber optic bundle exposed to approximately 250 rad/hour for $19\frac{1}{2}$ hours. The radiation was fundamentally beta and gamma radiation from strontium, yttrium, and cesium in a storage tank for nuclear waste. Before the fiber optic bundle was darkened, a continuous visible transmission spectrum was obtained, and the transmission at the major argon-ion emission lines was measured directly with a separate argon-ion laser set up. This pre-characterization was necessary to evaluate the effectiveness of the laser lightening. Since an argon-ion laser was used as the source of visible electromagnetic radiation in the below set forth examples, these pre-characterization data were necessary to obtain. While the visible electromagnetic radiation was produced by a laser source in the following examples, the electromagnetic radiation to effect lightening is not necessarily coherent. It is believed that the darkening is due to the creation of absorption centers within the optical element, and these intermolecular absorption centers can be removed by dosing with the proper electromagnetic radiation, which need not be coherent.

Prior to the exposure to the beta and gamma radiation set forth above, the fiber optic bundle was optically transparent and would transmit a very sharp optical image; however, after the exposure, the bundle was nearly opaque essentially no light being transmitted. A faint red laser light transmission could be observed, but exposure to the beta and gamma radiation completely destroyed the optical usefulness of this fiber optic bundle.

As will be set forth below, to test the lightening of the visible electromagnetic radiation, the radiation-darkened fiber optic bundle was exposed to the 4880 and 5145 angstrom lines of an argon-ion laser at various power levels.

The laser energy was applied only to one fiber optic aperture with the optical axis of the laser beam perpendicular to the fiber optic aperture face. Measurement of the bulk optical property of a fiber optic bundle is difficult because of the physical and optical complexity of the bundle. Fiber optic transmission is dependent on the bulk glass transmission as well as other parameters including losses from the numerical aperture limits, aperture or end reflection as well as internal losses from bending and nonhomogeneities of the glass and imperfections in the core-clad bonding.

Numerical aperture loss results from the acceptance angle limit of the fiber optic bundle and is a function of the ratio of the refractive indices of the core and clad as well as the incident light ray angle. The net result is a reduction in the input intensity for a diverging or converging light beam relative to a collimated beam. Because all fibers in a fiber optic bundle are not precisely aligned to the major axis, darkening occurs at the output end of the bundle at high viewing angles resulting in localized variations in the fiber optic transmission. Transmission efficiencies for the fiber optic bundle depend on packing densities where the input optical beam is larger than a single fiber area, and this is particularly true with coherent fiber optic bundles where the packing factor is critical and generally well controlled to produce undistorted images.

Since radiation exposure affects the bulk optical transmission properties of the fiber optic bundle and not other losses due to the factors discussed above, relative fiber optic transmission measurements, that is measurements of the same fiber optic bundle taken before radiation and subsequent to radiation, provide adequate indices of the darkening effects of the radiation as well as the lightening effects of the subject inventive methods. Nevertheless, all optical transmission data herein reported and set forth are comparative data, and must be treated as such.

Figures 1, 4, 11:
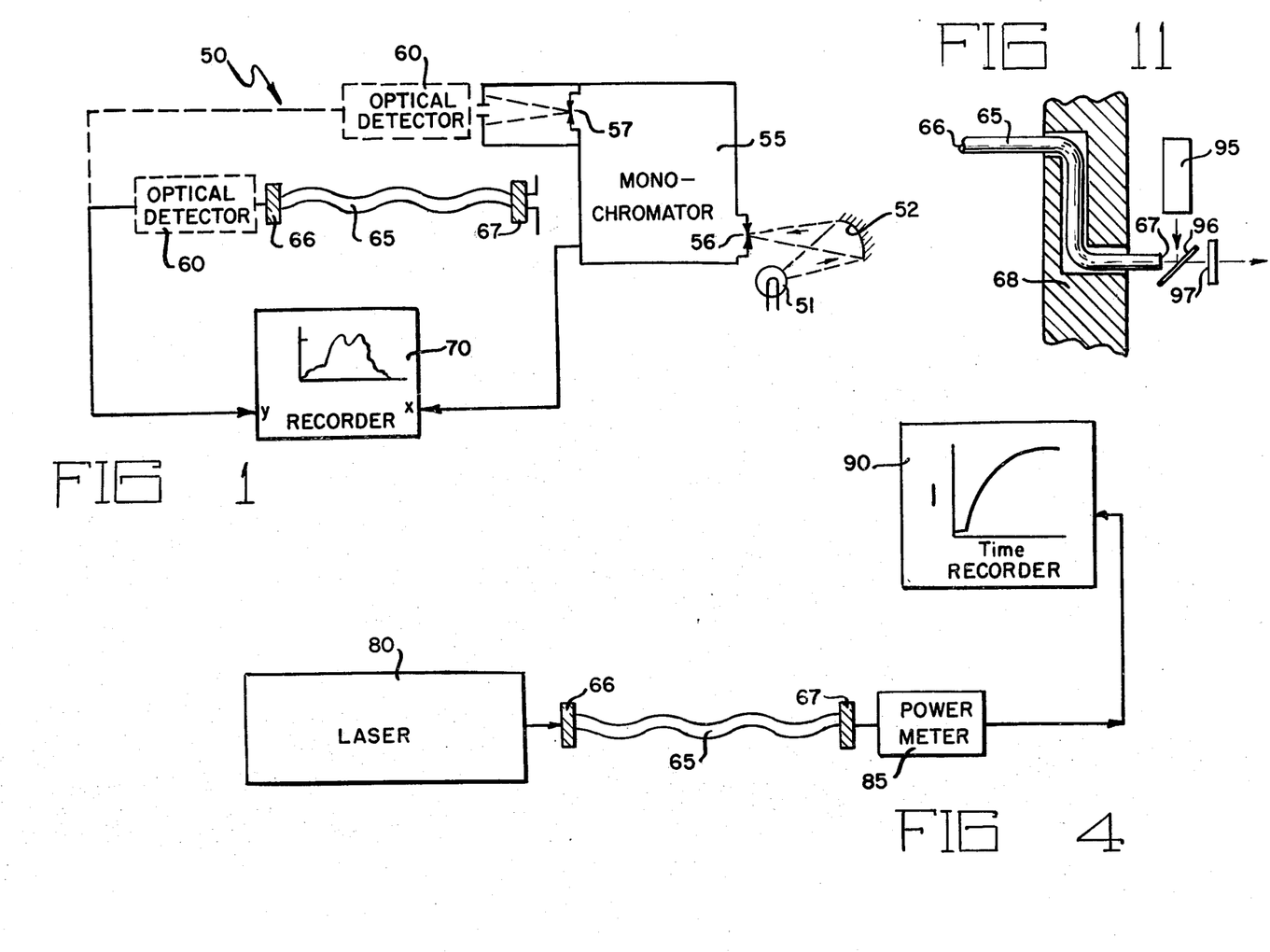
FIG. 1 is a schematic diagram of a system for obtaining spectral transmission measurements.
FIG. 4 is a system for laser lightening of a radiation darkened fiber optic bundle with a real-time transmission gauging system.
FIG. 11 is a schematic diagram of a system for lightening a fiber optic bundle in-situ during use of the fiber optic to transmit image or optical data.

Referring now to FIG. 1, there is disclosed a system 50 for spectral transmission measurements having as a light source a tungsten halide lamp 51, and a reflector 52 positioned to direct the reflected beam from the lamp 51 into a monochromator 55 through an inlet 56. Interiorly of the monochromator 55, but not specifically illustrated, there is a double holographic grading design which provides spectral sectioning of the illumination source, that is the tungsten halide lamp 51. The wavelength dispersion of the exit beam leaving the output 57 was less than 0.5 angstrom. An RCA-8645 photomultiplier tube with S-20 photocathode response (3000–8000 angstroms) was used as the optical signal detector 60. The optical detector 60 was used alone to generate test data for reference purposes, and after a fiber optic bundle 65 was connected to the optical detector 60, then measurements were obtained with the fiber optic bundle 65 in the system to obtain the comparative data hereinafter set forth. The monochromator system 50 was easily optically coupled to the fiber optic bundle 65, and since aperture mounts 66 and 67 for the fiber optic bundle 65 were attached to both ends prior to taking any measurements, the exact repositioning of the fiber optic bundle 65 for all measurements was possible. Finally the optical detector 60 and the monochromator 55 were connected to an x-y recorder 70 to graphically record the data.

The output wavelength of the optical detector 60 is the product of the individual module responses and can be expressed as the multiplication product of the wavelengths of the tungsten halide lamp 51 and the monochromator 55 and the detector 60 and the fiber optic bundle 65. For all spectral data obtained a correction was made by dividing the wavelength response from the optical detector 60 with the fiber optic bundle 65 in the system, see curve (b) of FIG. 2, by the response from the detector 60 without the fiber optic bundle 65 in the system, see curve (a) in FIG. 2. During generation of the data set forth in FIGS. 2 and 3, as well as for the remainder of the data set forth hereinafter, the temperature of the lamp 51 as well as the optical detector 60 were maintained constant.

Figure 2:
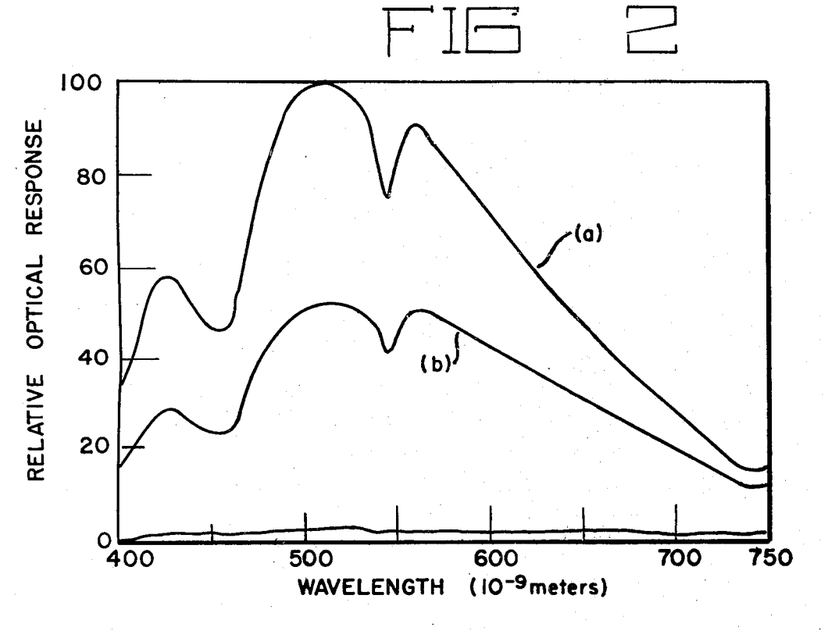
FIG. 2 is a graph showing the relationship between optical response and wavelength using the system illustrated in FIG. 1 wherein curve (a) is a system calibration curve without the fiber optic bundle and curve (b) is the optical response curve with the fiber optic bundle preirradiation.

As before stated, FIG. 2 illustrates the uncorrected data for the test circuit, curve (a) being that data generated without the presence of the fiber optic bundle 65 in test circuit and curve (b) being data generated with the fiber optic bundle in the test circuit.

Figure 3:
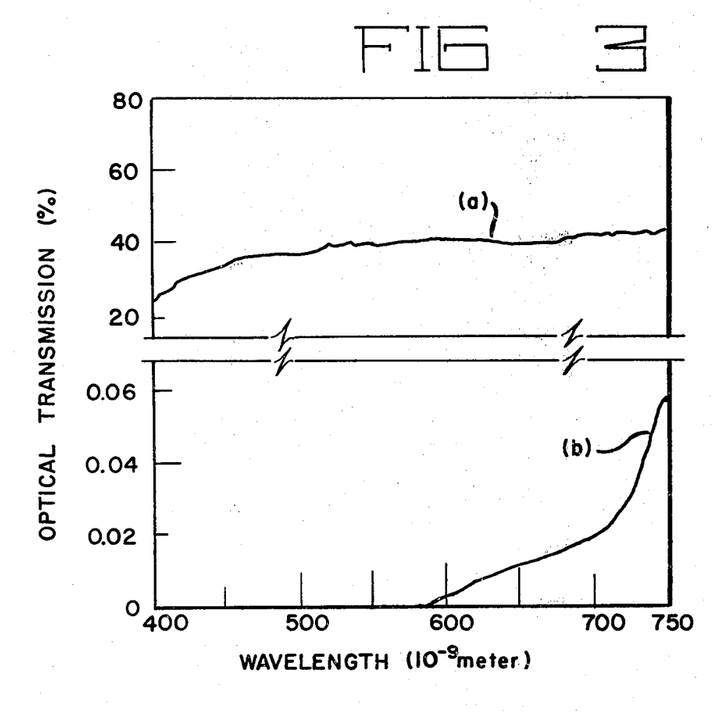
FIG. 3 is a graph showing the relationship between optical transmission and wavelength using the system set forth in FIG. 1 with the spectral response of a fiber optic bundle being illustrated prior to irradiation curve (a) and subsequent to exposure of 5000 rad for curve (b)

FIG. 3 is a graph showing the spectral response of the fiber optic bundle 65 prior to radiation, curve (a), and subsequent to exposure to 5000 rad beta and gamma radiation, curve (b). The large change in scale between the two responses as well as the high radiation-induced absorption in the short wavelength region is characteristic of fiber optic bundle radiation darkening. To accommodate the three decade range of transmission levels measured herein, calibrated neutral density filters were used to attenuate the monochromator 55 output. Each filter (not shown) had a manufactured-supplied calibration curve as a function of wavelength which was added to the spectra normalization calculation previously set forth herein. With the use of these filters, the detector 60 and the source parameters were held constant for all levels of optical transmission.

Because the monochromator 55 output beam exiting through the outlet 57 was not a collimated beam but rather an expanding cone of light and because of the numerical aperture property of the fiber optic bundle 65, the input efficiency was less than would have been if a collimated beam were used as a light source. Since an argon-ion laser was used as a source for later evaluation of radiation darkening and lightening effects, transmission measurements for all of the major and minor argon-ion laser lines were made in a separate optical set up which consisted of a laser source and an optical detector 60 illustrated. The transmission data, set forth in Table 1, shows the same transmission decrease for shorter wavelength as illustrated in FIG. 3. However, the transmission values are of higher absolute number due to the beam collimation and subsequent greater coupling efficiency into the fiber optic bundle 65 than was present with the test system previously described.

TABLE I

Fiber Optic Bundle Transmission for Argon-Ion Laser Lines*

| Wavelength | Power Level | Percent Transmission |
|---|---|---|
| $514.5 \times 10^{-9}$ Meter | $30 \times 10^{-3}$ Watts | 60% |
| $501.7 \times 10^{-9}$ Meter | $10 \times 10^{-3}$ Watts | 60% |
| $496.5 \times 10^{-9}$ Meter | $10 \times 10^{-3}$ Watts | 60% |
| $488.0 \times 10^{-9}$ Meter | $30 \times 10^{-3}$ Watts | 49% |
| $476.5 \times 10^{-9}$ Meter | $10 \times 10^{-3}$ Watts | 56% |
| $472.7 \times 10^{-9}$ Meter | $10 \times 10^{-3}$ Watts | 54% |
| $465.8 \times 10^{-9}$ Meter | $3 \times 10^{-3}$ Watts | 52% |
| $457.9 \times 10^{-9}$ Meter | $10 \times 10^{-3}$ Watts | 50% |

*Percent of energy remaining when the fiber optic bundle was inserted into the laser's natural collimated beam.

FIG. 4 shows the apparatus used to measure the lightening affect on a radiation-darkened fiber optic bundle 65 as optical energy was introduced into one end of the fiber optic bundle. Specifically, fiber optic bundle 65 having both x-y positioners 66 and 67 at the ends thereof was positioned intermediate a tuneable-argon laser 80. The argon-ion laser 80 was a 5 watt tuneable model (Spectra Physics Model 165) with a stabilized output control to maintain the laser at a fixed power level for extended periods of time. Various calibrated optical detectors 85 were utilized to record the output intensity of the signal from the fiber optic bundle 65. A Spectra Physics power laser meter was used as an optical detector 85 as was a colorimeter and an EGG photometer. Initial tests showed that the laser power meter 85, and the photometer were input beam shape sensitive but could follow fast initial transmission changes. With the exception of this initial response period, all detectors 85 indicated a similar relative transmission change in the fiber optic bundle 65 during the lightening test. The initial response to the optical energy showed an increase in attenuation measured with the laser power meter 85 and photometer 85. All other long time interval responses were colorimeter recorded. The energy transmitted through the fiber optic bundle 65 was recorded on a strip chart recorder 90 during each laser run. Transmission levels normally varied from start to finish over a three decade range, see FIG. 5 which is a comparison of the relative fiber optic transmission plotted against time lapse for different laser power levels.

Figure 5:
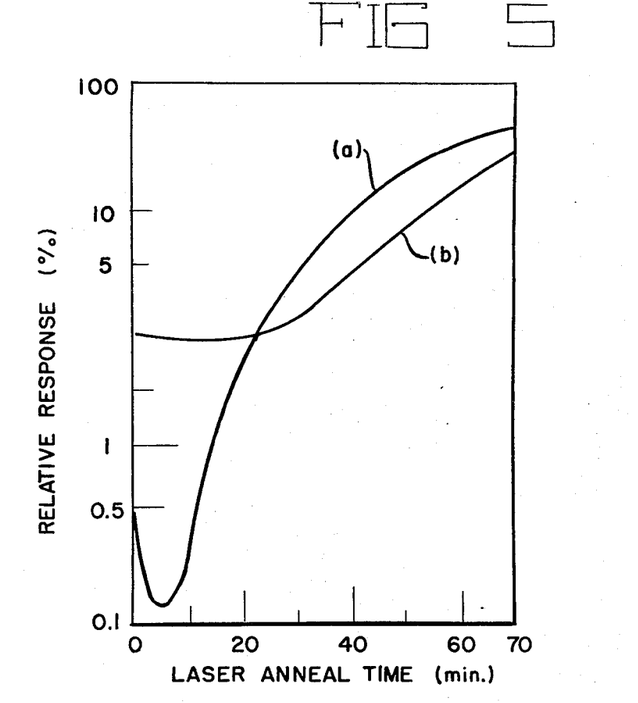
FIG. 5 is a graph illustrating the relationship between relative response and laser application time for two different power levels, curve (a) being for a higher power level than curve (b)

FIG. 5 represents typical data for two different laser power levels which clearly shows the negative change in transmission during the initial portion of the application of optical energy. Curve (a) is for a power level about ten times greater than curve (b) and shows a quicker lightening but both power levels produced about the same total or final lightening. Various laser power densities were obtained by adjusting the laser emission level and by focusing or defocusing the laser energy on the fiber optic bundle 65. As only a small portion of the fiber optic bundle 65 was affected during each run or application of optical energy, several applications were completed with a single fiber optic bundle 65.

Figure 6:
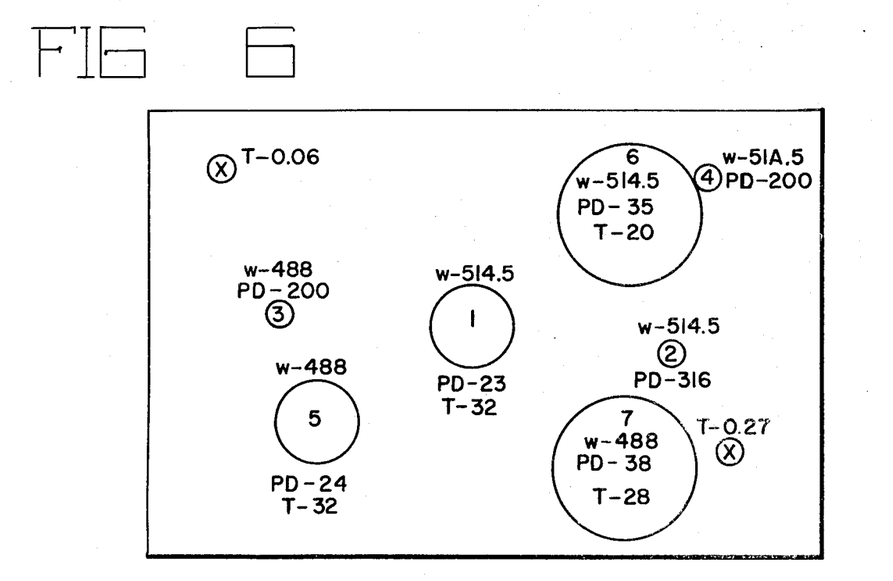
FIG. 6 is a graphical representation of a fiber optic end face showing various lightened areas due to laser applications with varying laser wavelengths and power densities.

FIG. 6 shows various areas lightened from several applications of optical energy, the smaller spots being from a converged or focused laser beam with the larger areas being from a diverging or unfocused laser beam.

The fiber optic bundle 65 used in all of the lightening runs had identical glass characteristics, the chemical composition and physical characteristics of the fiber optic bundle 65 being set forth in Table II. The glass is relatively standard for fiber optic bundles 65 which are not specifically designed to be radiation resistant. The fiber optic bundle 65 was a coherent bundle, that is an image focused at one end appeared at the other end, with the ends bonded in aluminum ferrules with an epoxy resin. As indicated in Table II, potential epoxy damage is the thermal limitation for the fiber optic bundle 65, and temperatures exceeding the epoxy melting point or damage point will result in loss of the coherency of the bundle.

TABLE II

Fiber Optical Test Bundle Characteristics

Serial No. OL259, Part No. 05002
Chemical Content of Fibers*
    Fiber Optic Core Glass    45% $SiO_2$, 45% PbO, 5% $K_2O$,
    (Flint F-2 Glass)    4% $Na_2O$.
    Fiber Optic Clad Glass    68% $SiO_2$, 16% $Na_2O$, 5% CaO,
        4% MgO, 2.8% $Al_2O_3$,
        2% BaO, 1.5% $B_2O_3$.
Temperature Limits
    Optical Fiber -    425°–450° C. no physical effects
        650° C. - Damage expected
    Epoxy Binder -    200° C. - Damage expected
Optical Fiber Dimensions
    Cross - Section - $10 \times 10^{-6}$ meter diameter
    Length - 3 feet
Bundle Aperture Area
    ⅜ × 13/32 inch

*Fiber Optic Bundle Fabricated by American Optic, Southbridge, MA

The success of lightening radiation-darkened fiber optic bundles by the application of optical energy is clearly illustrated in FIGS. 6 through 10 wherein FIG. 6 is a representation of the end view of the bundle 65 after the several applications of optical energy with the laser 80. In FIG. 6, w=wavelength (10-9 meter); PD=power density (watts/cm$^2$); T is transmission % (He-Ne laser); and x indicates no lightening. Spot number 4 impinges on spot number 6 to some extent with respect to the large spot number 7, some of the optic fiber bundle's potting epoxy was damaged by the incident laser light. Damage of this type is easily avoided by air cooling the surface of the fiber optic bundle and epoxy to prevent excessive temperatures at the epoxy surface. For spot number 7, an investigation of the other end of the fiber optic bundle 65 showed an identical transmitted light pattern, but the surface at the end opposite to the laser was not affected or altered in any way by the application of the laser energy, indicating that the epoxy damage was due to energy absorbed directly by the epoxy and not from heat transferred from the optical fiber, per se.

Figure 7:
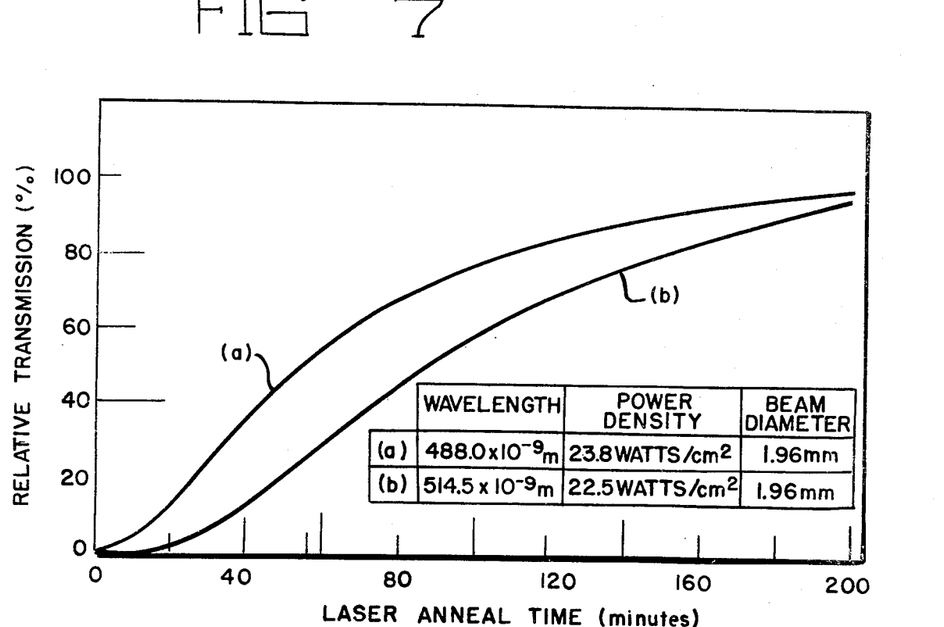
FIG. 7 is a graph showing the relationship between the relative transmission and the laser application time applied to a fiber optic bundle with two different laser wavelengths.
Figure 8:
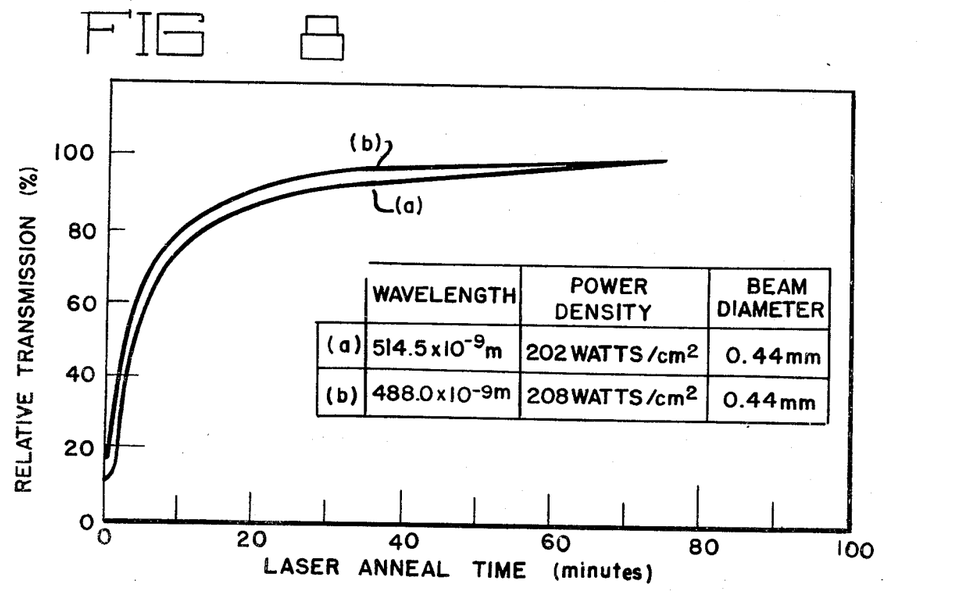
FIG. 8 is a graph like FIG. 7 with the same wavelengths but power densities approximately ten times that illustrated in FIG. 7.
Figure 9:
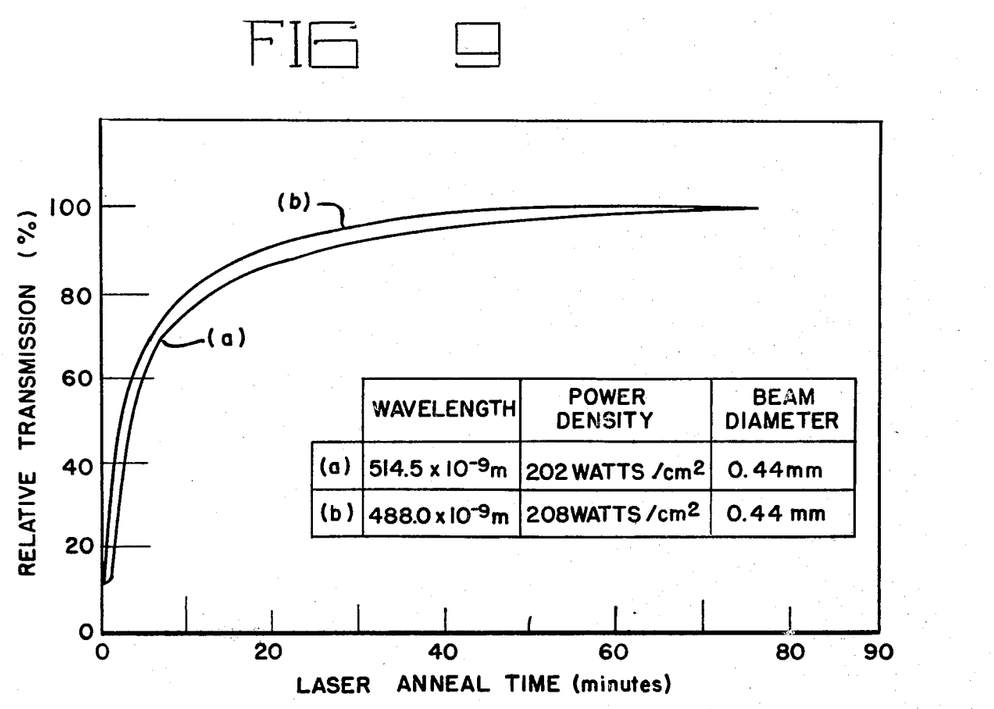
FIG. 9 is a graph like FIG. 8 for different runs.

The typical response time of the fiber transmission during lightening is shown in FIG. 5, the change in optical transmission normally spanning about three decades. The immediate increase in absorption followed by a rapid decrease was a characteristic response for all lightening tests including both wavelength and power density variations. The exact cause of the initial negative transmission change is unknown. The bulk of the transmission change occurs during a relatively short time interval and asymptotically approaches a final limiting transmission level. This is evident in FIGS. 7, 8 and 9 which show the dependence of lightening on the laser wavelength and power density. In FIG. 7, for equal power density of about 23 to 24 watts/cm$^2$, the shorter 4880 angstrom laser wavelength produced a faster change in transmission than the longer 5145 angstrom laser line. In FIG. 8, with power densities increased by almost a factor of 10, a similar transmission rate of change is observed, compare the 200 minute point in FIG. 7 with the 20 minute point in FIG. 8. In both lightening runs, the shorter laser line produced a faster lightening of the radiation-induced absorption or darkening. FIG. 9 shows a similar faster rate of transmission change with the increased power level. The terminal transmission level for all these tightened responses was different. For response comparison, the curves were normalized to a transmission value where the time rate of change was nearly zero, for example the 200 minute time point in FIG. 7.

The transmission in the lightened areas was very difficult to measure because of the lightened spot size. Transmission values for a He-Ne laser, collimated beam source, are illustrated in FIG. 6 for only the larger lightened fiber optic areas and two unlightened areas. These measurements were made by focusing the He-Ne laser beam on the inner area of the lightened spot and monitoring the relative transmission of the laser light. The numerical aperature variation and end reflection of the fiber optic bundle 65 were lumped with the bulk transmission in this transmission data. A comparison of the lightened and the darkened areas shows a transmission change for the lightened areas of at least a factor of 100.

Figure 10:
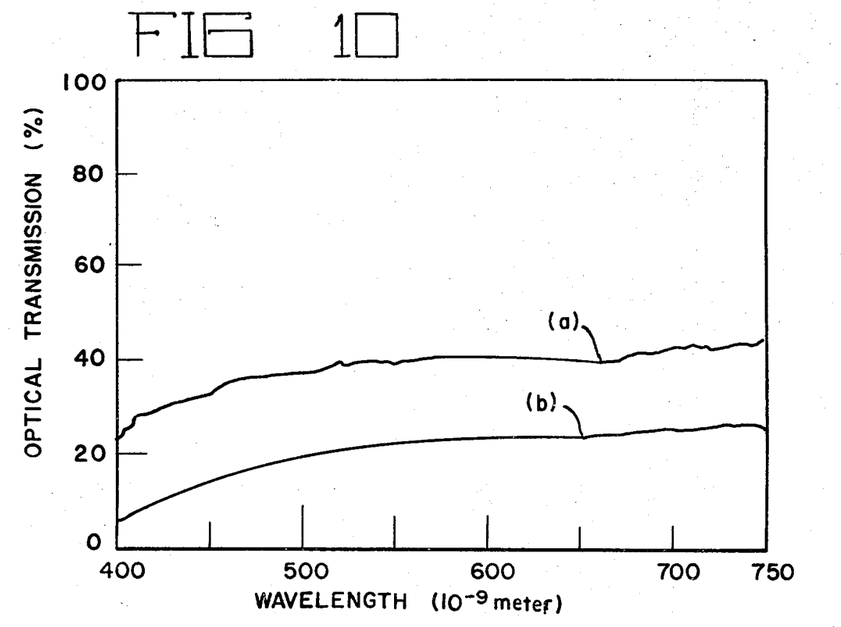
FIG. 10 is a graph showing the relationship between optical transmission and wavelength measured with the system set forth in FIG. 1 showing the relationship between the transmission responses prior to irradiation for curve (a) and subsequent to irradiation and laser lightening for curve (b)

The fiber optic bundle 65 spectra response graphically illustrated in FIG. 3 shows the typical short wavelength absorption from radiation exposure. After lightening, the fiber optic bundle 65 retained the original spectral transmission as shown in FIG. 10. The lightened fiber optic transmission curve (b) in FIG. 10 was obtained from the data illustrated in spot no. 1 in FIG. 6. Because of the different fiber optic end losses due to beam shape sensitivity, the spectral response measured with the monochromator 85 shows a lower value at the 6328 angstrom line than that obtained with the collimated He-Ne laser beam. The spectral response in FIG. 10 curve 10-b shows a complete proportional transmission restoration for the total visible spectrum range of from about 4000 to about 7500 angstroms. In comparing all the pre- and post-irradiation spectral and single wavelength measurement, it appears that the most complete laser lightening test restored fiber optic transmission to about 50% of its initial transmission level over the visible spectrum range. It is assumed that the remaining 50% transmission level could be restored if the laser 80 were moved relative to the fiber optic bundle 65 in order to provide incidental optical energy to all portions of the fiber optic bundle 65. In the examples set forth herein, the fiber optic bundle 65 was stationary with respect to the laser 80, whereby only a percentage of the total glass area of the fiber optic bundle was supplied with optical energy.

The foregoing has illustrated that optical energy can be used to lighten radiation-induced darkening in a common fiber optic element 65. The optical fibers used herein were not radiation resistant and experienced a severe darkening with a 5000 rad beta and gamma radiation exposure. The optical energy lightening restored the fiber optic transmission level to 50% of its initial value uniformly over the entire visible spectrum without any relative movement between the fiber optic bundle 65 and the source of optical energy 80. In order to ensure that all molecules of the fiber optic bundle 65 are treated with the optical energy relative movement would be required. Nevertheless, lightening occurred with laser power densities as low as 22 watt/cm$^2$, and during time intervals of between 3 and 5 hours. The rate of lightening was found to be power density and wavelength dependent with faster lightening for shorter wavelength and faster lightening rates with higher power densities. The only damage to the fiber optic bundle 65 was a slight surface bubbling of the input aperture epoxy bonding material, while the epoxy bonding material at the exit end of the fiber optic bundle 65 was not affected by the incident optical energy. Air cooling of the epoxy surface at the incident end will obviate this problem.

Reference to FIG. 11, illustrates apparatus for a method of lightening a fiber optic element 65 while at the same time transmitting image or optical data through the fiber optic bundle. In this case the fiber optic bundle 65 having an end 66 inside a radiation field and another end 67 outside the radiation field extends through a radiation barrier 68. A source 95 of optical energy is positioned to direct the beam therefrom toward a beam splitter 96 with an optical filter 97 being positioned downstream from the beam splitter 96. By using this arrangement, the lightening may proceed while the fiber optic bundle 65 is in actual use, since the light source 95 is blocked from the optical exit. If the fiber optic bundle 65 is used only for data transmission, as in a communication link, the lightening optical energy may be electronically separated from the optically detected output by frequency filtering, data coding or interlacing the optical energy between the data interval.

For ac data encoded on an optic beam, a simple CW (dc) optical source could be filtered out of the detected output signal with a frequency filter. In the illustrated system, the optical energy used to lighten the radiation-darkened fiber optic bundle 65 transverses the same optical path as the optical energy carrying the desired information from the radiation zone. Therefore, use of a frequency filter or data coding, or interlacing the optical energy used to lighten a radiation-darkened fiber optic or other optical element permits in-situ lightening of a radiation-darkened optical element without disturbing the optical element or the use thereof. Clearly, the capability of in-situ lightening radiation-darkened elements during the simultaneous transmission of data by the optical element is a significant improvement in the state of the art.

While there has been described what at present is considered to be a preferred embodiment of the present invention, it will be understood that various alterations and modifications may be made therein without departing from the true spirit and scope of the present invention, and is intended to cover in the claims appended hereto all such alterations and modifications.

The embodiments of the invention in which an exclusive property or privilege is claimed are defined as follows:

1. A method of lightening a radiation-darkened optical element, comprising directing electromagnetic radiation having a wavelength in the range of from about 2000 to about 20,000 angstroms into a preselected area of the optical element for a period of time sufficient to effect the desired lightening.

2. The method set forth in claim 1, wherein the electromagnetic radiation is visible light.

3. The method set forth in claim 1, wherein the electromagnetic radiation is coherent light.

4. The method set forth in claim 1, wherein the power density of the radiation is at least 20 watts per square centimeter.

5. The method set forth in claim 1, wherein the optical element had a major axis and the radiation is directed substantially parallel thereto.

6. The method set forth in claim 1, wherein the optical element has a major axis and the radiation is directed to intersect the major axis along a preselected area.

7. The method set forth in claim 1, wherein the period of time is less than about 4 hours.

8. The method set forth in claim 1, and further comprising the step of cooling the exterior surface of the optical element impinged by the electromagnetic radiation to maintain the exterior surface below a preselected temperature.

9. A method of lightening a radiation-darkened in-situ optical element without disturbing the transmission of information by the optical element, comprising directing electromagnetic radiation having a wavelength in the range of from about 2000 to about 20,000 angstroms into a preselected area of the optical element for a period of time sufficient to effect the desired lightening, and providing means for maintaining the directed electromagnetic radiation separate from the transmitted information, whereby the optical element is lightened in-situ while in use transmitting information without interference by the directed electromagnetic radiation.

10. The method set forth in claim 9, wherein the electromagnetic radiation has a wavelength less than about 20,000 angstroms.

11. The method set forth in claim 9, wherein said means includes a color filter to differentiate the electromagnetic radiation and the information signal spectrally.

12. The method set forth in claim 9, wherein said means includes a frequency filter to differentiate the electromagnetic radiation and the information signal according to electromagnetic frequency.

13. The method set forth in claim 9, wherein said means inclues time interfacing mechanism to interrupt the information signal periodically in order to permit the application of the electromagnetic radiation during the interruption of the information signal, whereby to lighten the optical element without interfering with the transmitted information signal.

14. A method of lightening a radiation-darkened in-situ galss fiber optic, comprising providing a source of light having a wavelength in the range of from about 2000 to about 20,000 angstroms, directing the light into the in-situ glass fiber optic, and moving the light over a preselected volume of the in-situ glass fiber optic for a period of time sufficient to effect the desired lightening.

15. The method set forth in claim 14, wherein the light is directed substantially parallel to the major axis of the glass fiber optic.

16. The method set forth in claim 14, wherein the light is directed at an angle other than parallel to the major axis of the fiber optic.

17. The method set forth in claim 14, wherein the period of time is less than about 4 hours.

18. The method set forth in claim 14, wherein the source of light is a laser having a power density of at least about 20 watts per square centimeter.

19. The method set forth in claim. 14, wherein the source of light is a laser having a power density at least about 20 watts per square centimeter and emitting light having a wavelength of between about 4500 angstroms and about 5500 angstroms.

* * * * *